US011970011B2

(12) United States Patent
Lum et al.

(10) Patent No.: US 11,970,011 B2
(45) Date of Patent: Apr. 30, 2024

(54) FLUID-EJECTION ELEMENT BETWEEN-CHAMBER FLUID RECIRCULATION PATH

(71) Applicant: Hewlett-Packard Development Company, L.P., Spring, TX (US)

(72) Inventors: Jacob Lum, Corvallis, OR (US); Alexander Govyadinov, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 108 days.

(21) Appl. No.: 17/799,420

(22) PCT Filed: Mar. 5, 2020

(86) PCT No.: PCT/US2020/021162

§ 371 (c)(1),
(2) Date: Aug. 12, 2022

(87) PCT Pub. No.: WO2021/177963

PCT Pub. Date: Sep. 10, 2021

(65) Prior Publication Data

US 2023/0105703 A1 Apr. 6, 2023

(51) Int. Cl.

| | |
|---|---|
| ***B41J 2/18*** | (2006.01) |
| ***B41J 2/14*** | (2006.01) |
| *B41J 2/05* | (2006.01) |

(52) U.S. Cl.

CPC ............... *B41J 2/18* (2013.01); *B41J 2/1404* (2013.01); *B41J 2/14112* (2013.01); *B41J 2/05* (2013.01); *B41J 2202/12* (2013.01)

(58) Field of Classification Search

CPC ........ B41J 2/18; B41J 2/1404; B41J 2/14112; B41J 2/05; B41J 2002/14475; B41J 2202/12

See application file for complete search history.

(56) References Cited

U.S. PATENT DOCUMENTS

| | | | |
|---|---|---|---|
| 8,444,259 | B2 | 5/2013 | Bennett |
| 8,939,531 | B2 | 1/2015 | Govyadinov et al. |
| 9,156,262 | B2 | 10/2015 | Taff et al. |
| 2003/0016256 | A1 | 1/2003 | Harvey et al. |

(Continued)

FOREIGN PATENT DOCUMENTS

| | | |
|---|---|---|
| JP | 2004-358701 A | 12/2004 |
| WO | 2009/136915 A1 | 11/2009 |

(Continued)

OTHER PUBLICATIONS

Through-channel ink recirculation, online available at <https://www.iacs.be/through-channel-ink-recirculation.html>, retrieved on Oct. 19 2019, pp. 5.

*Primary Examiner* — Thinh H Nguyen
(74) *Attorney, Agent, or Firm* — Foley & Lardner LLP

(57) ABSTRACT

A fluid-ejection element of a fluid-ejection device includes a chamber layer having a pair of chambers fluidically disconnected from one another within the chamber layer. The fluid-ejection element includes a tophat layer over the chamber layer and fluidically connecting the chambers to define a fluid recirculation path between the chambers. The fluid-ejection element includes a nozzle common to both the chambers.

15 Claims, 7 Drawing Sheets

(56) References Cited

U.S. PATENT DOCUMENTS

| | | | |
|---|---|---|---|
| 2011/0316918 | A1 | 12/2011 | Nagashima |
| 2014/0078224 | A1 | 3/2014 | Park et al. |
| 2017/0313063 | A1* | 11/2017 | Govyadinov ........ B41J 2/14056 |
| 2018/0201019 | A1 | 7/2018 | Seto et al. |
| 2019/0023008 | A1 | 1/2019 | Goh et al. |
| 2019/0111698 | A1 | 4/2019 | Govyadinov et al. |
| 2019/0299620 | A1 | 10/2019 | Koide et al. |

FOREIGN PATENT DOCUMENTS

| | | | |
|---|---|---|---|
| WO | 2013/162606 | A1 | 10/2013 |
| WO | 2018/147829 | A1 | 8/2018 |

* cited by examiner

FLUID-EJECTION ELEMENT BETWEEN-CHAMBER FLUID RECIRCULATION PATH

BACKGROUND

Printing devices, including standalone printers as well as all-in-one (AIO) printing devices that combine printing functionality with other functionality like scanning and copying, can use a variety of different printing techniques. One type of printing technology is inkjet printing technology, which is more generally a type of fluid-ejection technology. A fluid-ejection device, such as a printhead or a printing device having such a printhead, includes a number of fluid-ejection elements with respective nozzles. Firing a fluid-ejection element causes the element to eject fluid, such as a drop thereof, from its nozzle.

DETAILED DESCRIPTION

Figure 1A:
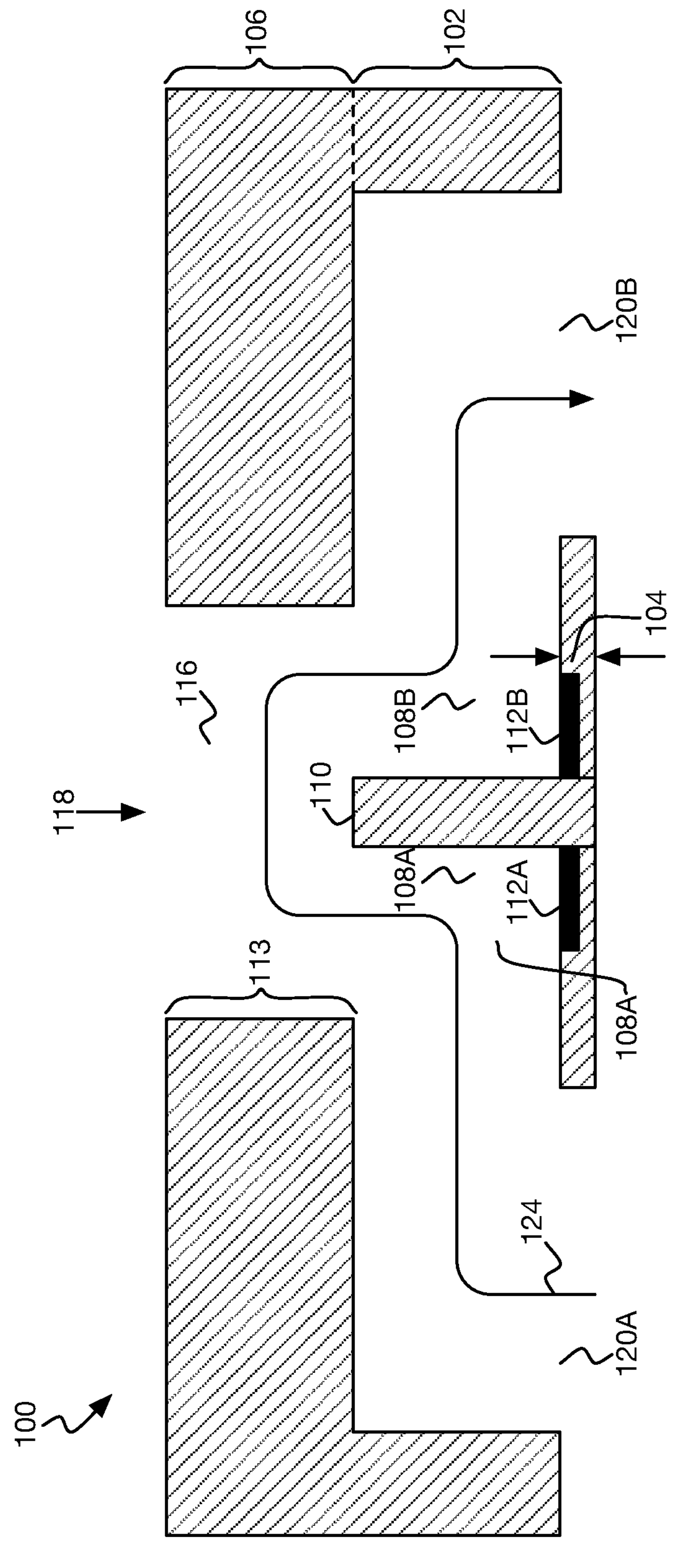
FIGS. 1A and 1B are side-view and top-view diagrams, respectively, of an example fluid-ejection element of a fluid-ejection device and through which fluid recirculation can occur via a fluid recirculation path.

As noted in the background, firing a fluid-ejection element of a fluid-ejection device causes the element to eject fluid from its nozzle. Different types of fluid-ejection devices, including different types of inkjet-printing devices, can employ a variety of different types of fluid. For example, inkjet-printing devices may use dye-based and/or pigmented inks. Dye-based inks include colorant that is fully dissolved in carrier liquid, whereas pigmented inks include a powder of solid colorant particles suspended in carrier liquid. Inks and other fluids vary in volatility, which is the propensity of the carrier liquid to evaporate, and further can vary in solid weight percentage, which is the percentage by weight of the solids contained within a fluid or an ink.

Fluids like ink that have greater volatility and/or that are higher in solid weight percentage are more likely to form viscous plugs at the nozzles of fluid-ejection elements. A viscous plug forms when fluid sufficiently dries out at the nozzle, leaving behind a greater mass of solid particles that clog the nozzle in the form of a plug. Such clogged nozzles can deleteriously affect image quality, by impeding or preventing fluid ejection through the nozzles, and/or by affecting the amount or trajectory of fluid ejected through the nozzles. Different fluid-ejection devices may be rated by "decap" time for different fluids, which is the length of time that nozzles can remain open and uncapped before plug formation is likely to occur.

To impede plug formation, some types of fluid-ejection elements permit fluid to be recirculated through their chambers even when the elements are in standby and not actively printing. The chamber of a fluid-ejection element is the cavity above the element's firing resistor that contains the volume of fluid that is ejected from the element when the resistor is energized, or fired. Traditionally the chamber of a fluid-ejection element was replenished with fluid after firing, after which this fluid remained within the chamber until the next time the element was fired. By comparison, more recent fluid-ejection element architectures can permit fluid to continuously recirculate through the chambers of fluid-ejection elements. Such fluid recirculation reduces the likelihood of plug formation.

However, due, for example, to the relationship between high print quality and high solid content and/or high volatility printing fluids, there is an ever-increasing desire to print with ever more challenging inks. That is, fluid-ejection devices are being called upon to eject fluid that have even greater volatility and/or that are even higher in solid weight percentage. Even fluid-ejection elements that provide for through-chamber fluid recirculation can struggle with such more challenging fluids. That is, even fluid-ejection elements that permit fluid to be recirculated through their chambers may still not satisfactorily inhibit plug formation with such fluids. A limited solution is to increase the velocity with which fluid is recirculated; however, such techniques are of limited effectiveness and may cause other image quality issues.

Described herein are techniques for fluid-ejection element fluid recirculation that can ameliorate these issues. Such techniques permit the usage of fluid with greater volatility and/or that are higher in solid weight percentage without having to increase recirculation velocity to impede plug formation as with existing fluid-ejection element architectures, broadening the types of ink, for instance, that can be used in inkjet-printing devices. For a type of fluid at a given volatility and a given solid weight percentage, the techniques can indeed allow for lower recirculation velocity while still impeding plug formation as compared to existing fluid-ejection element architectures, which may potentially improve resulting image quality.

FIG. 1A shows a side view of an example fluid-ejection element 100 of a fluid-ejection device. The fluid-ejection element 100 can include a chamber layer 102, a primer layer 104, and a tophat layer 106. The chamber layer 102 includes a pair of chambers 108A and 1086, which are collectively referred to as the chambers 108. The chambers 108 are fluidically disconnected from one another within the chamber layer 102. That is, unlike a fluid-ejection element that has one fluidically contiguous chamber, the fluid-ejection element 100 has multiple fluidically discontiguous chambers 108. The chamber layer 102 includes an inter-chamber wall 110 that fluidically separates the chambers 108 within the chamber layer 102.

The primer layer 104 can also be referred to as an SU-8 layer, where SU-8 is a type of photoresist. The fluid-ejection element 100 includes a pair of firing resistors 112A and 1126 respectively disposed within the primer layer 104, at the bottoms of the chambers 108A and 1086. The primer layer 104 may be absent. The firing resistors 112A and 1126 are collectively referred to as the firing resistors 112. Unlike a fluid-ejection element that has one firing resistor, the fluid-ejection element 100 thus has multiple firing resistors 112. The firing resistors 112 are positioned to either side of the inter-chamber wall 110. As described in more detail later in the detailed description, the firing resistors 112 can be concurrently fired to cooperatively eject fluid from the fluid-ejection element 100, and can be separately fired to agitate fluid within the chambers 108.

The tophat layer 106 includes a bore layer 113. In the example of FIG. 1A, the bore layer 113 makes an entirety of the bore layer 113 in thickness. The bore layer 113 is disposed over the chamber layer 102 and has a bore 116 fluidically connecting the chambers 108. That is, while the chambers 108 are fluidically disconnected within the chamber layer 102 itself, they are fluidically connected at and via the bore layer 113 of the tophat layer 106. The bore 116 is integral and fluidically contiguous within the bore layer 113.

In the example of FIG. 1A, the bore 116 defines a nozzle 118 of the fluid-ejection element 100; that is, the nozzle 118 corresponds to the bore 116 in FIG. 1A. The nozzle 118 is aligned (e.g., centered) over the inter-chamber wall 110. The nozzle 118, through which fluid ejection occurs, is common to both chambers 108. Unlike a fluid-ejection element having one chamber and one firing resistor with a corresponding nozzle, the fluid-ejection element 100 thus has multiple chambers 108 and multiple firing resistors 112 sharing the same nozzle 118. The firing resistors 112 are positioned off-center relative to the nozzle 118, which is unlike a fluid-ejection element having one firing resistor that may be centered relative to its nozzle.

The chamber layer 102 has openings 120A and 120B, which are collectively referred to as the openings 120. The openings 120 are fluidically connected to respective chambers 108 within the chamber layer 102. Fluid from the fluid-ejection device of which the fluid-ejection element 100 is a part or to which the element 100 is fluidically connected is supplied through the opening 120A to the chamber 108A. Fluid from the chamber 108B is returned through the opening 1206 to the fluid-ejection device.

A fluid recirculation path 124 is defined within the fluid-ejection element 100. The tophat layer 106, for instance, defines the fluid recirculation path 124 between the chambers 108, from the chamber 108A to the chamber 1086, as a result of the bore 116 fluidically connecting the chambers 108. Therefore, even when the fluid-ejection element 100 is not printing, fresh fluid can continuously recirculate through the element 100. Fluid pumped from the fluid-ejection device of which the fluid-ejection element 100 is a part or to which the element 100 is fluidically connected enters at the opening 120A, and flows to the chamber 108A and then to the chamber 108B via the bore 116 before exiting at the opening 120B.

In the fluid-ejection element 100, fluid recirculation is said to occur at the level of the tophat layer 106, as opposed to the level of the chamber layer 102. That is, fluid flows through the tophat layer 106, closer in totality to the top of the tophat layer 106 than if fluid could flow directly from the chamber 108A to the chamber 108B without being directed into the bore 116 (e.g., such as due to the presence of the inter-chamber wall 110). Stated another way, if the fluid-ejection element 100 had just one chamber 108, then fluid could directly flow through the chamber 108 itself as well as through the bore 116. In the fluid-ejection element 100, fluid thus directly flows through the bore 116 just within the tophat layer 106 instead of within both the tophat layer 106 and the chamber layer 102, or within just the chamber layer 102.

Having fluid flow through the tophat layer 106 in this way permits usage of fluid with greater volatility and/or that is higher in solid weight percentage without necessarily having to increase the velocity at which fluid is pumped for recirculation through the fluid-ejection element 100. Similarly, having fluid flow through the tophat layer 106 in this way permits usage of fluid at a given volatility and a given solid weight percentage with lower recirculation velocity. This is because more of the fluid flowing through the tophat layer 106 is concentrated at or near the top of the tophat layer 106 than if fluid also or just flowed through the chamber layer 102.

Figure 1B:
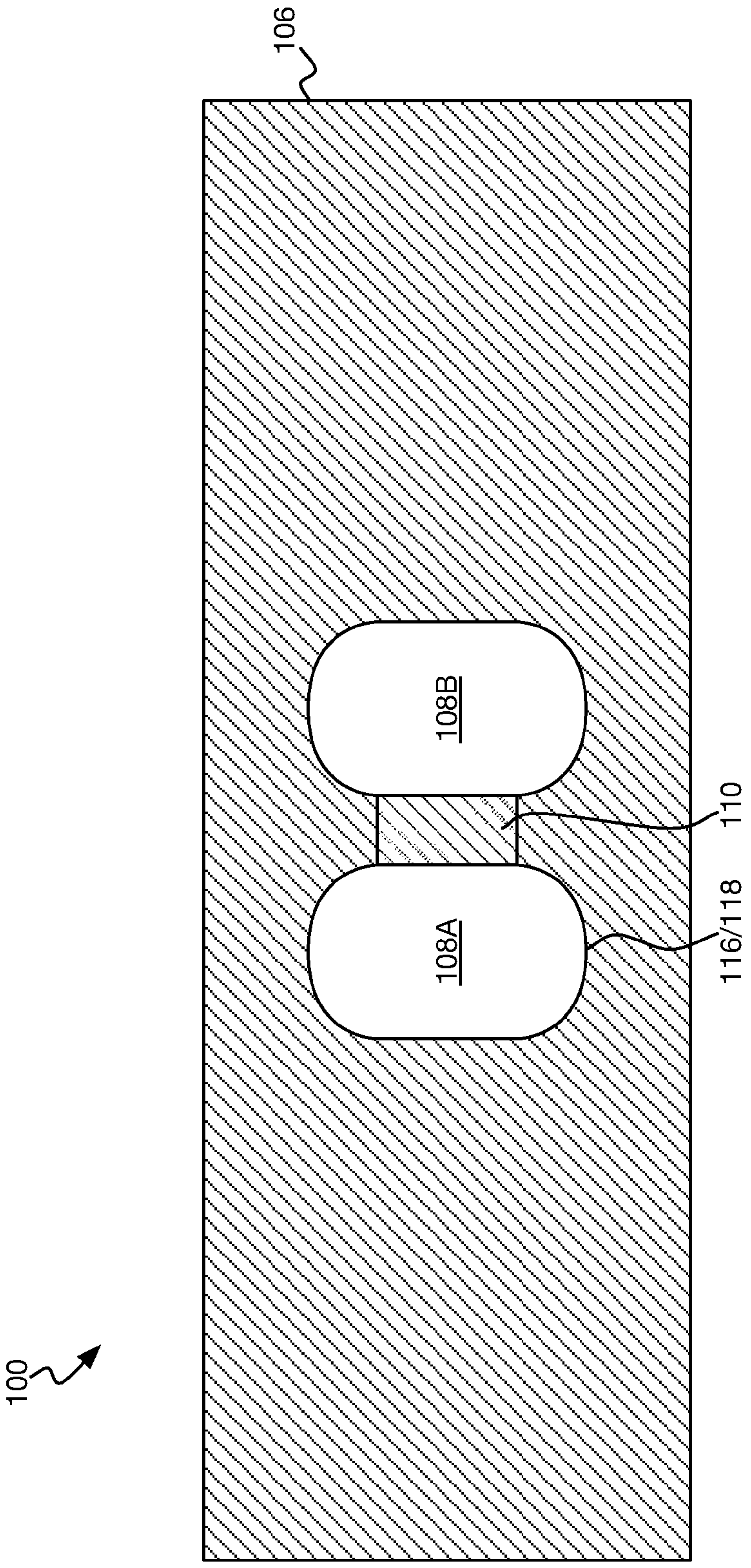

FIG. 1B shows a top view of the fluid-ejection element 100 of FIG. 1A. The nozzle 118 of the fluid-ejection element 100—that is, the bore 116 of the tophat layer 106 that defines the nozzle 118—has a figure 8-type shape in the example of FIG. 1B. The chambers 108 are visible through the bore 116, as is the inter-chamber wall 110. The bore 116, and thus the nozzle 118, may have a shape other than that depicted in FIG. 1B, such as a circular, oval, dog bone, or another type of shape.

Figure 2A:
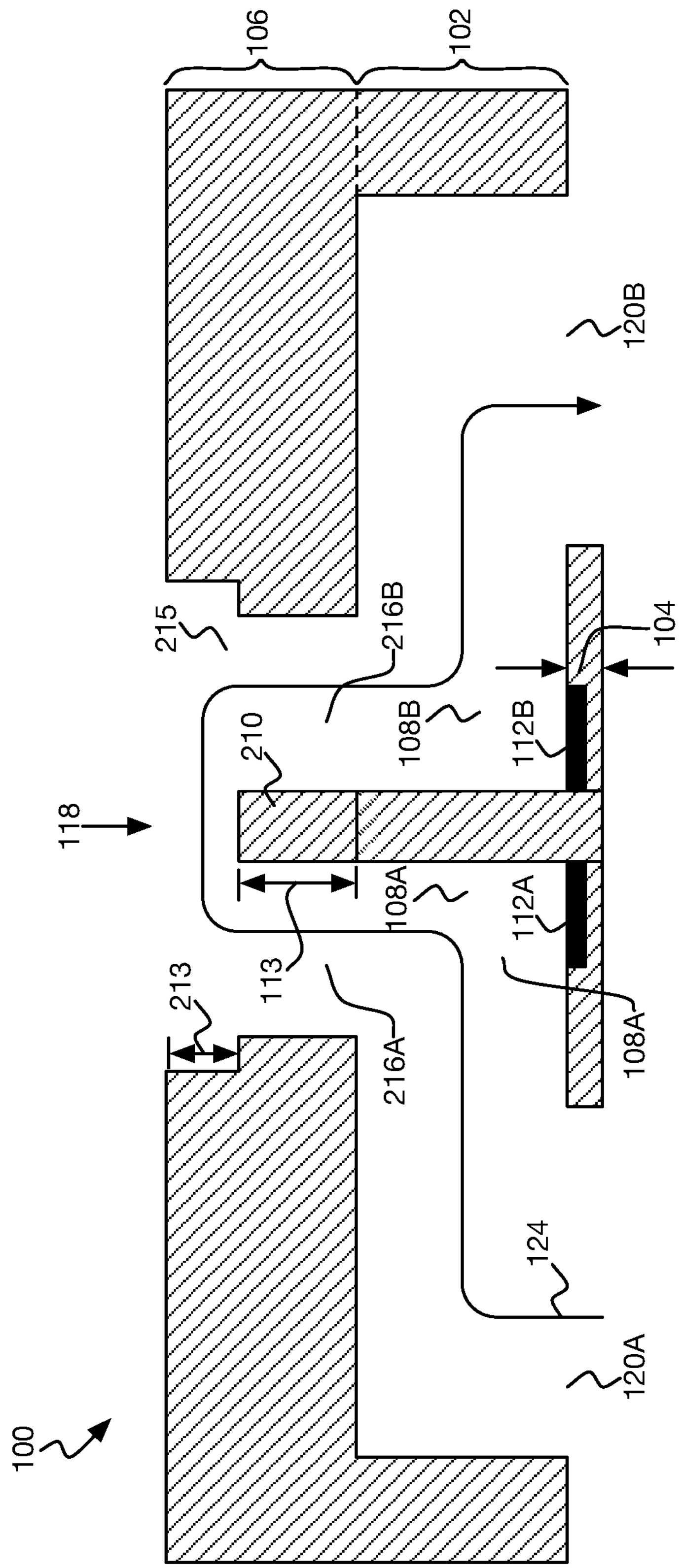
FIGS. 2A and 2B are side-view and top-view diagrams, respectively, of another example fluid-ejection element of a fluid-ejection device and through which fluid recirculation can occur via a fluid recirculation path.

FIG. 2A shows a side view of another example fluid-ejection element 100 of a fluid-ejection device. The fluid-ejection element 100 of FIG. 2A again includes a chamber layer 102, a primer layer 104, and a tophat layer 106. The chamber layer 102 includes the pair of chambers 108A and 108B, which are collectively referred to as the chambers 108 and which are fluidically disconnected from one another within the chamber layer 102. As in FIG. 1, the inter-chamber wall 110 of the fluid-ejection element 100 fluidically separates the chambers 108 within the chamber layer 102. The fluid-ejection element 100 of FIG. 2A can similarly include a primer layer 104 having a pair of firing resistors 112A and 112B, which are respectively disposed at the bottoms of the chambers 108A and 108B and are collectively referred to as the firing resistors 112. The primer layer 104 may be absent.

In the example of FIG. 2A, the tophat layer 106 includes a counterbore layer 213 in addition to the bore layer 113. The bore layer 113 is disposed over the chamber layer 102 in FIG. 2A, but unlike in FIG. 1, has a pair of bore parts 216A and 216B that are respectively fluidically connected to the chambers 108A and 108B and that collectively constitute a bore 216. The bore parts 216A and 216B are fluidically disconnected from one another within the bore layer 113. That is, the bore 216 is not integral and is not fluidically contiguous within the bore layer 113. The bore layer 113 includes an intra-bore wall 210 aligned over the inter-chamber wall 110 and that fluidically separates the bore 216 into fluidically discontiguous bore parts 216 within the bore layer 113.

The counterbore layer 213 is disposed over the bore layer 113 and has a counterbore 215 fluidically connecting the bore parts 216A and 216B, and thus correspondingly fluidically connecting the chambers 108. That is, while the chambers 108 are fluidically disconnected within the chamber layer 102, and while the bore parts 216A and 216B are fluidically disconnected within the bore layer 113, the chambers 108 and the bore parts 216A and 216B are fluidically connected at and via the counterbore layer 213 of the tophat layer 106. In the example of FIG. 2A, the counterbore 215 defines the nozzle 118 of the fluid-ejection element 100; that is, the nozzle 118 corresponds to the counterbore 215 in FIG. 2A. The nozzle 118 is aligned (e.g., centered) over both the intra-bore wall 210 and the inter-chamber wall 110. As in FIG. 1A, the nozzle 118 is common to both chambers 108 in FIG. 2A, and the firing resistors 112 are similarly positioned off-center relative to the nozzle 118.

In the example of FIG. 2A, the chamber layer 102 again has openings 120A and 120B, which are collectively referred to as the openings 120. The openings 120 are similarly fluidically connected to respective chambers 108 within the chamber layer 102. Fluid from the fluid-ejection device of which the fluid-ejection element 100 is a part or to which the element 100 is fluidically connected is supplied through the opening 120A to the chamber 108A. Fluid from the chamber 108B is likewise returned through the opening 120B to the fluid-ejection device.

The fluid recirculation path 124 is again defined within the fluid-ejection element 100 in FIG. 2A. The tophat layer 106 defines the fluid recirculation path 124 between the chambers 108, from the chamber 108A to the chamber 1086, as a result of the counterbore 215 fluidically connecting the bore parts 216A and 216B that are respectively connected to the chambers 108. Therefore, as in FIG. 1A, even when the fluid-ejection element 100 is not printing, fresh fluid can continuously recycle through the element 100. Pumped fluid is received at the opening 120A, and then flows to the chamber 108A and from the chamber 108A to the bore part 216A. From the bore part 216A, the fluid flows via the counterbore 215 to the bore part 216B, and then to chamber 108B before exiting at the opening 120B.

In the example of FIG. 2A, fluid recirculation within the fluid-ejection element 100 is again said to occur at the level of the tophat layer 106, as in FIG. 1A, as opposed to the level of the chamber layer 102. However, fluid flows in totality even closer to the top of the tophat layer 106 than in FIG. 1A. Unlike in FIG. 1A, in which fluid flows directly through the bore layer 113, fluid flows directly through the counterbore layer 213 in FIG. 2A; fluid cannot flow directly through the bore layer 113 in FIG. 2A due to the presence of the intra-bore wall 210. Because the counterbore layer 213 is shorter in height than the bore layer 113, fluid in totality flows that much closer to the top of the tophat layer 106.

Having fluid past the nozzle 118 in this way in FIG. 2A can permit usage of fluid with even greater volatility and/or that is even higher in solid weight percentage without having to increase fluid recirculation velocity than in FIG. 1A. Similarly, having fluid flow past the nozzle 118 in this way in FIG. 2A can permit usage of fluid at a given volatility and a given solid weight percentage with an even lower recirculation velocity than in FIG. 1A. This is because even more of the fluid flowing through the tophat layer 106 is concentrated at or near the top of the tophat layer 106 as compared to FIG. 1A.

Figure 2B:
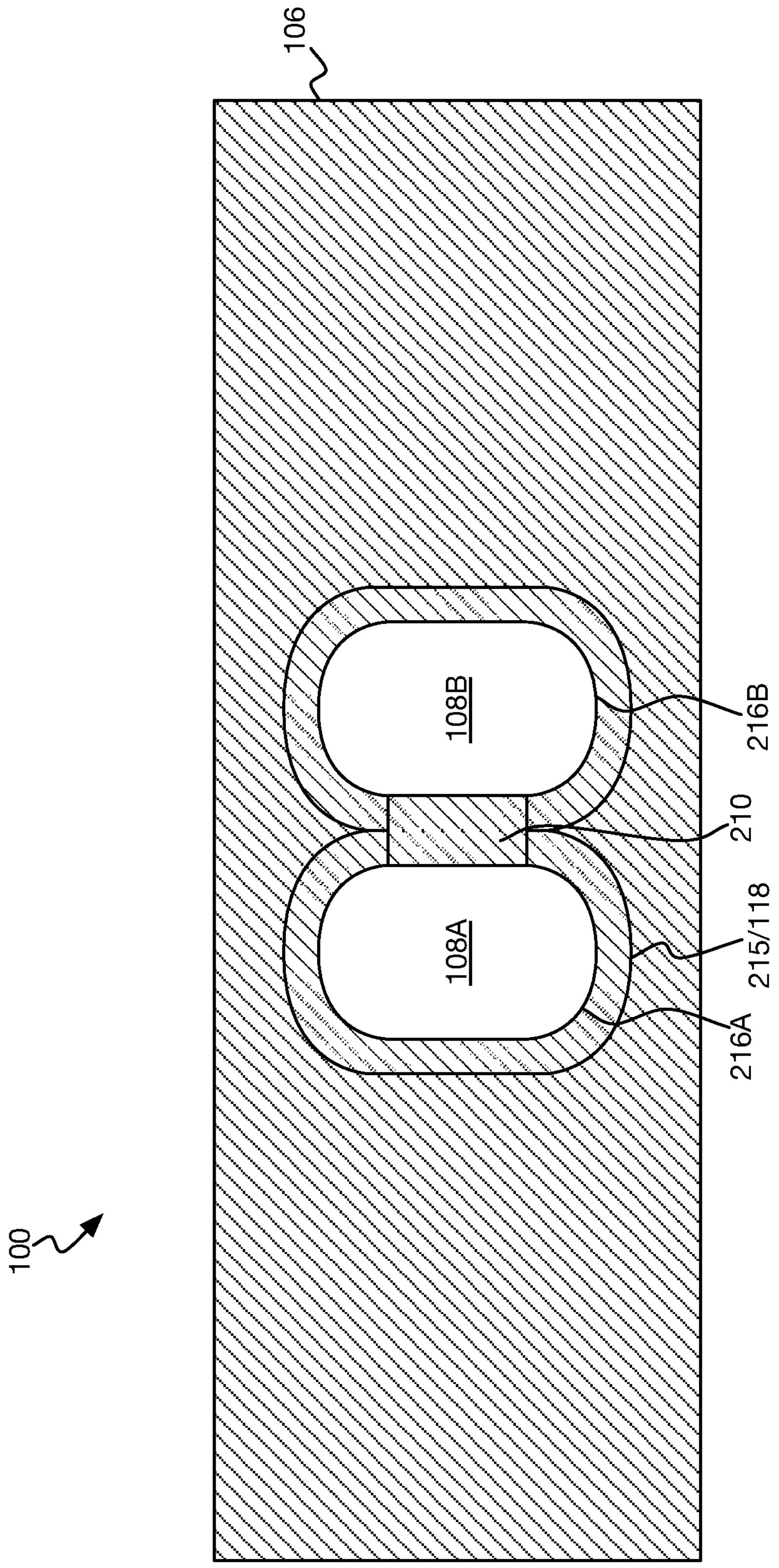

FIG. 2B shows a top view of the fluid-ejection element 100 of FIG. 2A. The nozzle 118 of the fluid-ejection element 100—that is, the counterbore 215 of the tophat layer 106 that defines the nozzle 118—has a figure 8-type shape in the example of FIG. 2B. The bore parts 216A and 216B are also visible through the counterbore 215, as are the chambers 108 and the intra-bore wall 210. Similar to FIG. 1B, the counterbore 215, and thus the nozzle 118, may have a shape other than that depicted in FIG. 2B, such as a circular, oval, dog bone, or another type of shape.

Figure 3:
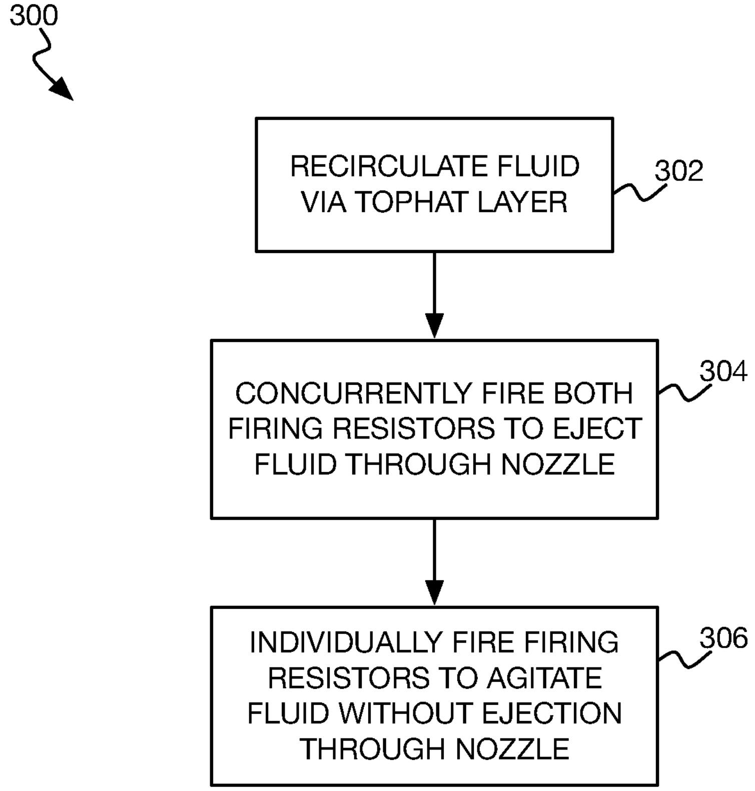
FIG. 3 is a flowchart of an example method for operating a fluid-ejection element having a pair of firing nozzles, a pair of chambers, and a common nozzle, such as that of FIGS. 1A and 1B or FIGS. 2A and 2B.

FIG. 3 shows an example method 300 for operating the fluid-ejection element 100. The method 300 includes recirculating fluid from the chamber 108A to the chamber 108B via the tophat layer 106 over the chamber layer 102 that includes the chambers 108 (302). In the example of FIG. 1A, such fluid recirculation occurs via the bore layer 113, because the bore 116 of the bore layer 113 fluidically connects the chambers 108 together. In the example of FIG. 2A, such fluid recirculation occurs via the counterbore layer 213, because the counterbore 215 of the counterbore layer 213 fluidically connects together the bore parts 216A and 216B, which are respectively fluidically connected to the chambers 108.

The method 300 can include concurrently, such as simultaneously, firing both firing resistors 112 to eject fluid from the chambers 108 through the nozzle 118 (304). That is, in one implementation, to eject fluid from one nozzle 118, two firing resistors 112 that share the nozzle 118 are both fired. This is unlike a fluid-ejection element having a firing resistor corresponding to each nozzle, in which fluid can be ejected from a nozzle by firing just its corresponding firing resistor. Fluid can be ejected from the nozzle 118 as part of image formation, for instance, such as to print an image on media like paper.

The method 300 can include individually firing the firing resistors 112 to instead agitate the fluid within the chambers 108 without ejecting fluid through the nozzle 118 (306). Such fluid agitation may be performed periodically or on-demand as part of a cleaning operation. For instance, even though the fluid-ejection element 100 inhibits plug formation, such a viscous plug may nevertheless form at the nozzle 118 if a particularly challenging fluid is being used in terms of volatility or solid weight percentage. Similarly, a viscous plug may nevertheless form if fluid recirculation velocity is set aggressively low for a given fluid. In such cases, fluid agitation may be sufficient to dislodge the plug from the nozzle 118 without having to perform a spitting operation in which fluid is forcibly ejected from the nozzle 118 during cleaning.

Figure 4:
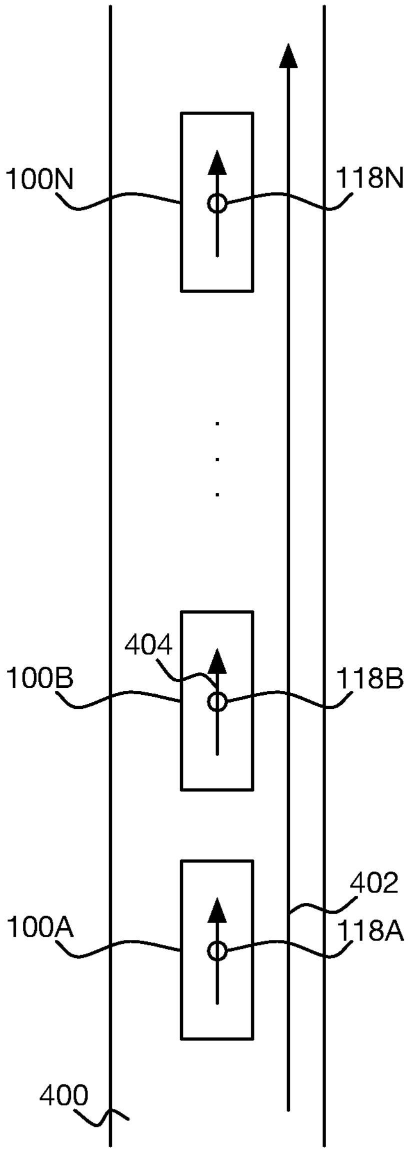
FIG. 4 is a top-view diagram of an example fluidic channel of a fluid-ejection device, showing how multiple fluid-ejection elements through which fluid recirculation can occur can be disposed relative to the fluidic channel.

FIG. 4 shows a top view of an example fluidic channel 400 of a fluid-ejection device. Fluid is pumped within the channel 400 along a fluid path 402. In the example of FIG. 4, multiple fluid-ejection elements 100A, 100B, . . . , 100N, collectively referred to as the fluid-ejection elements 100, are disposed length-wise over the channel 400. The fluid-ejection elements 100 have respective nozzles 118A, 118B, . . . , 118N, which are collectively referred as the nozzles 118. The fluid-ejection elements 100 are fluidically connected to the channel 400. Fluid thus flows within each fluid-ejection element 100 along a fluid-recirculation path 404 past the respective nozzle 118 of the element 100 and parallel to the fluid path 402.

Figure 5:
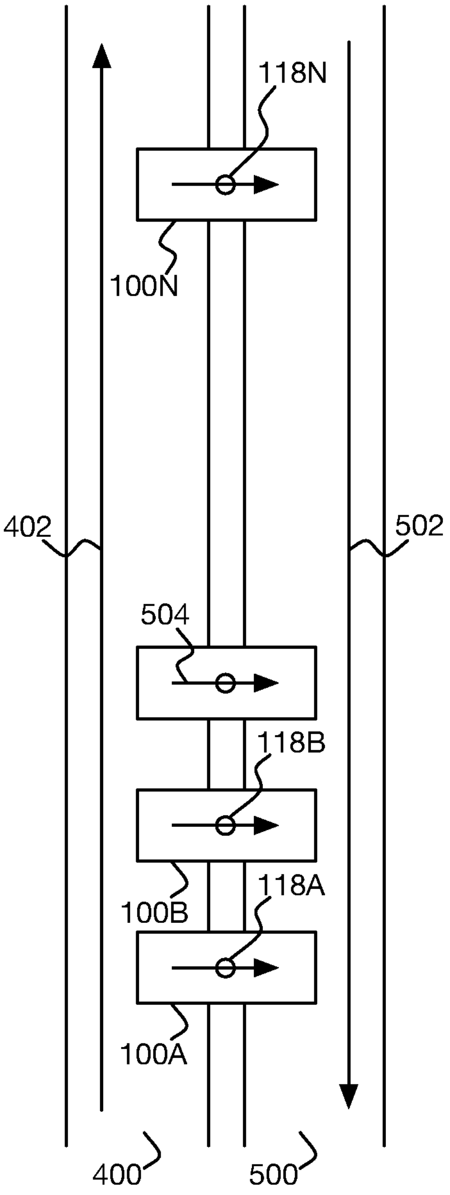
FIG. 5 is a top-view diagram of an example pair of fluidic channels of a fluid-ejection device, showing how multiple fluid-ejection elements through which fluid recirculation can occur can be disposed relative to the fluidic channels.

FIG. 5 shows a top view of an example pair of fluidic channels 400 and 500 of a fluid-ejection device. Fluid is pumped within the channel 400 along the fluid path 402, as in FIG. 4, and then returns within the channel 500 along the fluid path 502. The channels 400 and 500 are thus fluidically connected at some point in the fluid-ejection device, which is not depicted in FIG. 5. The fluid-ejection elements 100 are disposed perpendicular to and span the channels 400 and 500. The fluid-ejection elements 100 are fluidically connected to both channels 400 and 500. Fluid thus flows within each fluid-ejection element 100 along a fluid-recirculation path 504 past the respective nozzle of the element 100, perpendicular to the fluid paths 402 and 502.

Figure 6:
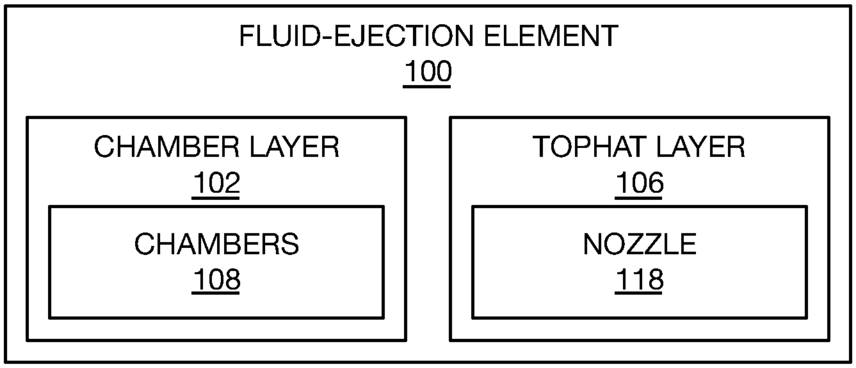
FIG. 6 is a block diagram of an example fluid-ejection element.

FIG. 6 shows an example fluid-ejection element 100 of a fluid-ejection device. The fluid-ejection element 100 includes a chamber layer 102 having a pair of chambers 108 fluidically disconnected from one another within the chamber layer 102. The fluid-ejection element 100 includes a tophat layer 106 over the chamber layer 102 and fluidically connecting the chambers 108 to define a fluid recirculation path between the chambers 108. The fluid-ejection element 100 includes a nozzle 118 within the tophat layer 106 and that is common to both the chambers 108.

Figure 7:
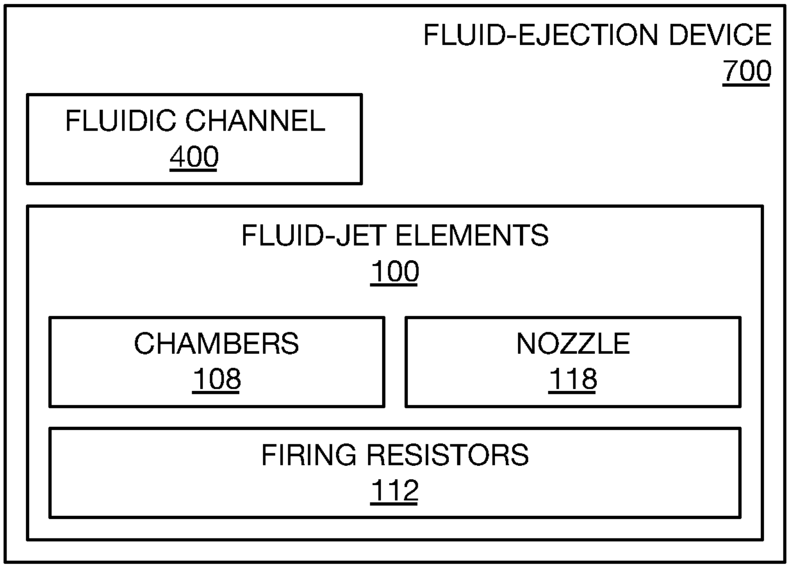
FIG. 7 is a block diagram of an example fluid-ejection device.

FIG. 7 shows an example fluid-ejection device 700. The fluid-ejection device 700 may be a fluid-ejection printhead, or a printing device that includes such a printhead. The fluid-ejection device 700 includes a fluidic channel 400. The fluid-ejection device 700 includes fluid-ejection elements 100 fluidically coupled to the fluidic channel 400. Each fluid-ejection element 100 includes a pair of chambers 108, a nozzle 118 common to both the chambers 108, and a pair of firing resistors 112 corresponding to the chambers 108 and that cooperatively eject fluid through the nozzle 118 when fired. Within each fluid-ejection element 100, the chambers 108 are fluidically connected to one another at a tophat layer over the chambers 108.

Figure 8:
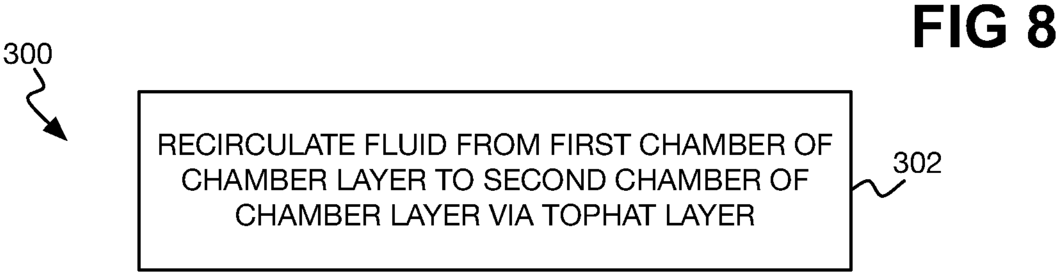
FIG. 8 is a flowchart of an example method.

FIG. 8 shows an example method 300. The method 300 includes recirculating fluid from a first chamber of a chamber layer of a fluid-ejection element to a second chamber of the chamber layer via a tophat layer of the fluid-ejection element over the chamber layer (302). The tophat layer fluidically connects the chambers to define a fluid recirculation path between the first and second chambers. The first and second chambers are fluidically disconnected from one another within the chamber layer.

Techniques have been described herein that provide for fluid-jet element recirculation of fluid having greater volatility and/or that is higher in solid weight percentage, without having to increase recirculation velocity to impede plug formation. For fluid at a given volatility and a given solid weight percentage, the techniques can permit fluid recirculation at a lower velocity while still impeding plug formation. Fluid recirculation occurs within a fluid-jet element at a tophat layer of the element, instead of at a chamber layer of fluid-jet element.

We claim:

1. A fluid-ejection element of a fluid-ejection device, comprising:

a chamber layer having a pair of chambers fluidically disconnected from one another within the chamber layer;

a tophat layer over the chamber layer and fluidically connecting the chambers to define a fluid recirculation path between the chambers; and a nozzle common to both the chambers.

2. The fluid-ejection element of claim 1, further comprising:

a pair of firing resistors respectively disposed at bottoms of the chambers to cooperatively eject fluid through the nozzle.

3. The fluid-ejection element of claim 2, wherein the chamber layer comprises an inter-chamber wall separating the chambers from one another within the chamber layer, and wherein the nozzle is aligned over the inter-chamber wall.

4. The fluid-ejection element of claim 3, wherein the firing resistors are positioned to either side of the inter-chamber wall and off-center relative to the nozzle.

5. The fluid-ejection element of claim 1, wherein the tophat layer comprises:

a bore layer over the chamber layer and having a bore to which the nozzle corresponds and that fluidically connects the chambers to define the fluid recirculation path between the chambers.

6. The fluid-ejection element of claim 1, wherein the tophat layer comprises:

a bore layer over the chamber layer and having a pair of bore parts fluidically disconnected from one another within the bore layer and respectively fluidically connected to the chambers; and a counterbore layer over the bore layer and having a counterbore to which the nozzle corresponds and that fluidically connects the bore parts to correspondingly fluidically connect the chambers and define the fluid recirculation path between the chambers.

7. The fluid-ejection element of claim 6, wherein the chamber layer comprises an inter-chamber wall separating the chambers from one another within the chamber layer, wherein the bore layer comprises an intra-bore wall aligned over the inter-chamber wall and separating the bore parts from one another within the bore layer, and wherein the nozzle is aligned over the inter-chamber and intra-bore walls.

8. A fluid-ejection device comprising:

a fluidic channel; and a plurality of fluid-ejection elements fluidically coupled to the fluidic channel, each fluid-ejection element comprising a pair of chambers, a nozzle common to both the chambers, and a pair of firing resistors corresponding to the chambers and to cooperatively eject fluid through the nozzle, wherein, within each fluid-ejection element, the chambers are fluidically connected to one another at a tophat layer over the chambers.

9. The fluid-ejection device of claim 8, wherein each fluid-ejection element further comprises:

a chamber layer in which the chambers are disposed, the chambers fluidically disconnected from one another within the chamber layer.

10. The fluid-ejection device of claim 8, wherein the tophat layer of each fluid-ejection element defines a fluid recirculation path between the chambers.

11. The fluid-ejection device of claim 8, wherein the tophat layer of each fluid-ejection element comprises:

a bore layer over the chambers and having a bore to which the nozzle corresponds that fluidically connects the chambers to define a fluid recirculation path between the chambers.

12. The fluid-ejection device of claim 8, wherein the tophat layer of each fluid-ejection element comprises:

a bore layer over the chambers and having a pair of bore parts fluidically disconnected from one another within the bore layer and respectively fluidically connected to the chambers; and a counterbore layer over the bore layer and having a counterbore to which the nozzle corresponds and that fluidically connects the bore parts to correspondingly fluidically connect the chambers and define a fluid recirculation path between the chambers.

13. A method comprising:

recirculating fluid from a first chamber of a chamber layer of a fluid-ejection element to a second chamber of the chamber layer via a tophat layer of the fluid-ejection element over the chamber layer, wherein the tophat layer fluidically connects the chambers to define a fluid recirculation path between the first and second chambers, and wherein the first and second chambers are fluidically disconnected from one another within the chamber layer.

14. The method of claim 13, further comprising:

concurrently firing first and second firing resistors respectively disposed at bottoms of the first and second chambers to cooperatively eject fluid through a nozzle common to both the first and second chambers.

15. The method of claim 13, further comprising:

firing just one of first and second firing resistors respectively disposed at bottoms of the first and second chambers to agitate fluid within the fluid-ejection element without ejecting the fluid through a nozzle.

* * * * *